(12) United States Patent
Matsumoto

(10) Patent No.: US 9,236,213 B2
(45) Date of Patent: *Jan. 12, 2016

(54) GLASS WELDING METHOD AND GLASS LAYER FIXING METHOD

(75) Inventor: Satoshi Matsumoto, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 395 days.

This patent is subject to a terminal disclaimer.

(21) Appl. No.: 13/511,738

(22) PCT Filed: Sep. 17, 2010

(86) PCT No.: PCT/JP2010/066143
§ 371 (c)(1),
(2), (4) Date: Jun. 13, 2012

(87) PCT Pub. No.: WO2011/065110
PCT Pub. Date: Jun. 3, 2011

(65) Prior Publication Data

US 2012/0240631 A1   Sep. 27, 2012

(30) Foreign Application Priority Data

Nov. 25, 2009   (JP) ................. P2009-267481

(51) Int. Cl.
*C03C 27/10* (2006.01)
*H01J 9/26* (2006.01)
(Continued)

(52) U.S. Cl.
CPC ............. *H01J 9/261* (2013.01); *B23K 26/0021* (2013.01); *B23K 26/18* (2013.01); *C03B 23/245* (2013.01); *C03C 27/06* (2013.01)

(58) Field of Classification Search
CPC ............. B32B 17/06–17/1099; C03B 33/091; C03B 33/0222; C03B 33/033; C03B 2201/12; C03B 23/203; C03B 33/076; C03B 33/023; C03B 33/0235; C03B 33/07; C03B 33/074; C03B 17/06; C03B 17/064; C03B 17/067; C03B 2203/23

USPC ................. 65/33.5–33.6, 43–44; 156/99
See application file for complete search history.

(56) References Cited

U.S. PATENT DOCUMENTS 3,453,097 A   7/1969   Hafner
3,663,793 A   5/1972   Petro et al.
(Continued)

FOREIGN PATENT DOCUMENTS

CN   1329395   1/2002
CN   1738777   2/2006
(Continued)

OTHER PUBLICATIONS

Yasui, Hideaki, Method for Manufacturing Image Display Device, Manufacturing Apparatus, and Image Display Device Manufactured by Using the Same. Translated by: The McElroy Translation Company Jun. 2012.*

(Continued)

*Primary Examiner* — Jodi C Franklin
(74) *Attorney, Agent, or Firm* — Drinker Biddle & Reath LLP

(57) ABSTRACT

At the time of temporary firing for fixing a glass layer 3 to a glass member 4, the glass layer 3 is irradiated with laser light L2 through the glass member 4 from the glass member 4 side. This fully heats a part of the glass layer 3 on the glass member 4 side and thus can improve the adhesion of the glass layer 3 to the glass member 4. Further, even when irradiated with the laser light L2 at such a laser power as to melt both edge parts of the glass layer 3, the part of the glass layer 3 on the side opposite from the glass member 4 (i.e., the part of the glass layer 3 fused to the other glass member) is prevented from being crystallized by excess heat input, whereby the fusing state of the glass layer 3 with respect to the other glass member can be made uniform.

5 Claims, 14 Drawing Sheets

(51) Int. Cl.
  *B23K 26/00* (2014.01)
  *B23K 26/18* (2006.01)
  *C03B 23/24* (2006.01)
  *C03C 27/06* (2006.01)

(56) References Cited

U.S. PATENT DOCUMENTS

| | | | |
|---|---|---|---|
| 4,343,833 | A | 8/1982 | Sawae et al. |
| 5,489,321 | A | 2/1996 | Tracy et al. |
| 6,565,400 | B1 | 5/2003 | Lee et al. |
| 7,371,143 | B2 | 5/2008 | Becken et al. |
| 7,641,976 | B2 | 1/2010 | Lamberson et al. |
| 7,820,941 | B2 | 10/2010 | Brown et al. |
| 7,834,550 | B2 | 11/2010 | Lee et al. |
| 7,932,670 | B2 | 4/2011 | Yoo et al. |
| 8,063,561 | B2 | 11/2011 | Choi et al. |
| 8,440,479 | B2 | 5/2013 | Nguyen et al. |
| 8,490,434 | B2 | 7/2013 | Watanabe et al. |
| 8,516,852 | B2 | 8/2013 | Matsumoto et al. |
| 2004/0069017 | A1 | 4/2004 | Li et al. |
| 2004/0207314 | A1 | 10/2004 | Aitken et al. |
| 2005/0103755 | A1 | 5/2005 | Baker et al. |
| 2006/0082298 | A1 | 4/2006 | Becken et al. |
| 2006/0084348 | A1 | 4/2006 | Becken et al. |
| 2007/0007894 | A1 | 1/2007 | Aitken et al. |
| 2007/0053088 | A1 | 3/2007 | Kranz et al. |
| 2007/0128967 | A1 | 6/2007 | Becken et al. |
| 2007/0170845 | A1 | 7/2007 | Choi et al. |
| 2007/0173167 | A1 | 7/2007 | Choi |
| 2008/0106194 | A1 | 5/2008 | Logunov et al. |
| 2008/0124558 | A1 | 5/2008 | Boek et al. |
| 2008/0135175 | A1 | 6/2008 | Higuchi |
| 2008/0182062 | A1 | 7/2008 | Becken et al. |
| 2009/0071588 | A1 | 3/2009 | Kimura et al. |
| 2009/0080055 | A1* | 3/2009 | Baur et al. ............... 359/267 |
| 2009/0086325 | A1 | 4/2009 | Liu et al. |
| 2009/0110882 | A1 | 4/2009 | Higuchi |
| 2009/0142984 | A1* | 6/2009 | Logunov et al. ............ 445/25 |
| 2009/0297861 | A1* | 12/2009 | Banks et al. ............ 428/428 |
| 2009/0297862 | A1 | 12/2009 | Boek et al. |
| 2009/0308105 | A1* | 12/2009 | Pastel et al. ............... 65/42 |
| 2010/0006228 | A1 | 1/2010 | Abe et al. |
| 2010/0095705 | A1 | 4/2010 | Burkhalter et al. |
| 2010/0116119 | A1 | 5/2010 | Bayne |
| 2010/0129666 | A1* | 5/2010 | Logunov et al. ............ 428/426 |
| 2010/0154476 | A1 | 6/2010 | Becken et al. |
| 2010/0267307 | A1 | 10/2010 | Park et al. |
| 2010/0304513 | A1* | 12/2010 | Nguyen et al. ............ 438/27 |
| 2011/0001424 | A1 | 1/2011 | Logunov et al. |
| 2011/0061789 | A1 | 3/2011 | Matsumoto |
| 2011/0067448 | A1 | 3/2011 | Matsumoto et al. |
| 2011/0072855 | A1 | 3/2011 | Matsumoto et al. |
| 2011/0088430 | A1 | 4/2011 | Matsumoto |
| 2011/0088431 | A1 | 4/2011 | Matsumoto |
| 2011/0135857 | A1 | 6/2011 | Logunov et al. |
| 2011/0169108 | A1 | 7/2011 | Gardner et al. |
| 2011/0223360 | A1 | 9/2011 | Shibuya et al. |
| 2011/0223371 | A1 | 9/2011 | Kawanami |
| 2011/0256407 | A1 | 10/2011 | Boek et al. |
| 2011/0265518 | A1 | 11/2011 | Matsumoto et al. |
| 2012/0111059 | A1 | 5/2012 | Watanabe et al. |
| 2012/0147538 | A1 | 6/2012 | Kawanami et al. |
| 2012/0151965 | A1 | 6/2012 | Matsumoto et al. |
| 2012/0156406 | A1* | 6/2012 | Banks et al. ............ 428/34.4 |
| 2012/0222450 | A1 | 9/2012 | Lamberson et al. |
| 2012/0234048 | A1 | 9/2012 | Matsumoto |
| 2012/0240628 | A1 | 9/2012 | Matsumoto |
| 2012/0240629 | A1 | 9/2012 | Matsumoto |
| 2012/0240630 | A1 | 9/2012 | Matsumoto |
| 2012/0240631 | A1 | 9/2012 | Matsumoto |
| 2012/0240632 | A1 | 9/2012 | Matsumoto |
| 2012/0240633 | A1 | 9/2012 | Matsumoto |
| 2012/0247153 | A1 | 10/2012 | Matsumoto |
| 2012/0260694 | A1 | 10/2012 | Matsumoto |
| 2012/0285200 | A1 | 11/2012 | Tanaka |
| 2012/0287026 | A1* | 11/2012 | Masuda ............ 345/76 |
| 2012/0318023 | A1 | 12/2012 | Shimomura |
| 2012/0320444 | A1* | 12/2012 | Baur et al. ............ 359/267 |
| 2013/0011598 | A1 | 1/2013 | Kawanami et al. |
| 2013/0104980 | A1 | 5/2013 | Sridharan et al. |
| 2013/0111953 | A1 | 5/2013 | Maloney et al. |
| 2013/0134396 | A1 | 5/2013 | Shimomura et al. |
| 2013/0174608 | A1 | 7/2013 | Takeuchi et al. |
| 2013/0237115 | A1 | 9/2013 | Choi et al. |
| 2013/0280981 | A1* | 10/2013 | Lee ............ 445/25 |
| 2013/0314760 | A1* | 11/2013 | Baur et al. ............ 359/267 |

FOREIGN PATENT DOCUMENTS

| | | | |
|---|---|---|---|
| CN | 1798708 | 7/2006 | |
| CN | 1798710 | 7/2006 | |
| CN | 1836177 | 9/2006 | |
| CN | 101005915 | 7/2007 | |
| CN | 101095247 | 12/2007 | |
| CN | 101103429 | 1/2008 | |
| CN | 101139165 | 3/2008 | |
| CN | 100409392 C | 8/2008 | |
| CN | 101312234 | 11/2008 | |
| CN | 101386477 | 3/2009 | |
| CN | 101434453 | 5/2009 | |
| CN | 101501808 | 8/2009 | |
| CN | 102056858 | 5/2011 | |
| JP | 2-120259 | 5/1990 | |
| JP | 5166462 | 7/1993 | |
| JP | 2000-313630 | 11/2000 | |
| JP | 2002-015108 | 1/2002 | |
| JP | 2002-224871 | 8/2002 | |
| JP | 2002-287107 | 10/2002 | |
| JP | 2002-366050 | 12/2002 | |
| JP | 2002-367514 | 12/2002 | |
| JP | 2002366050 | * 12/2002 | ............ G09F 9/00 |
| JP | 2004-182567 | 7/2004 | |
| JP | 2005-007665 | 1/2005 | |
| JP | 2005-213125 | 8/2005 | |
| JP | 2006-151774 | 6/2006 | |
| JP | 2006-524419 | 10/2006 | |
| JP | 2007-90405 | 4/2007 | |
| JP | 2007-264135 | 10/2007 | |
| JP | 2008-115057 | 5/2008 | |
| JP | 2008-115067 | 5/2008 | |
| JP | 2008-127223 | 6/2008 | |
| JP | 2008-527655 | 7/2008 | |
| JP | 2009-123421 | 6/2009 | |
| JP | 2009-196862 | 9/2009 | |
| KR | 10-0350323 | 3/2002 | |
| KR | 10 2007 003681 | 1/2007 | |
| TW | I495409 | 7/2002 | |
| TW | 200516064 | 5/2005 | |
| TW | I255934 | 6/2006 | |
| TW | 200733787 | 9/2007 | |
| TW | 200737370 | 10/2007 | |
| TW | 200822789 | 5/2008 | |
| TW | 200911438 | 3/2009 | |
| TW | 200944908 | 11/2009 | |
| WO | WO 2007/067533 | 6/2007 | |
| WO | WO 2009/131144 | 10/2009 | |
| WO | 2009/150976 | 12/2009 | |
| WO | WO 2009/150975 | 12/2009 | |
| WO | WO 2009-157281 | 12/2009 | |
| WO | WO 2009-157282 | 12/2009 | |

OTHER PUBLICATIONS

U.S. Office Action dated Jan. 22, 2013 that issued in U.S. Appl. No. 13/345,199 including Double Patenting Rejections on pp. 6-8.
JP 20022366050 (Human Translation), retrieved from the USPTO Translation Services and attached to the U.S. Office Action dated Apr. 25, 2013 in U.S. Appl. No. 12/994,539.
JP 2008115057 (Human Translation), retrieved from USPTO Translation Services and attached to the U.S. Office Action dated Apr. 25, 2013 in U.S. Appl. No. 12/994,539.
U.S. Office Action date Apr. 25, 2013 that issued in U.S. Appl. No. 12/994,539 including Double Patenting Rejections on pp. 5-8.

(56) References Cited

OTHER PUBLICATIONS

JP 20022366050 (Machine Translation), as attached to Office Action dated Jun. 1, 2012 in U.S. Appl. No. 12/994,354.
JP 2008115057 (Machine Translation), as attached to Office Action dated Jun. 1, 2012 in U.S. Appl. No. 12/994,354.
U.S. Office Action dated May 9, 2013 that issued in U.S. Appl. No. 12/994,399 including Double Patenting Rejections on pp. 6-10.
U.S. Office Action dated Jun. 6, 2012 that issued in U.S. Appl. No. 13/345,199 including Double Patenting Rejections on pp. 5-8.
U.S. Office Action dated Jun. 28, 2012 that issued in U.S. Appl. No. 12/994,320 including Double Patenting Rejections on pp. 7-9.
U.S. Office Action dated Jul. 9, 2012 that issued in U.S. Appl. No. 12/994,321 including Double Patenting Rejections on pp. 7-9.
Cheung, Kerry, "Die-Level Glass Frit Vacuum Packaging for a Micro-Fuel Processor System," Massachusetts Institute of Technology, Jun. 2005, pp. 17-19.
U.S. Office Action dated Jul. 2, 2014 that issued in U.S. Appl. No. 13/511,754 including Double Patenting Rejections on pp. 5-8.
U.S. Office Action dated Jun. 3, 2014 that issued in U.S. Appl. No. 13/511,683 including Double Patenting Rejections on pp. 5-11.
U.S. Office Action dated Jul. 1, 2014 that issued in U.S. Appl. No. 13/511,747 including Double Patenting Rejections on pp. 4-5.
U.S. Office Action dated Jan. 16, 2014 that issued in U.S. Appl. No. 13/511,735 including Double Patenting Rejections on pp. 4-8.
U.S. Office Action dated Jan. 28, 2014 that issued in U.S. Appl. No. 13/511,688 including Double Patenting Rejections on pp. 4-8.
U.S. Office Action dated Jul. 31, 2014 that issued in U.S. Appl. No. 12/994,354 including Double Patenting Rejections on pp. 7-10.
U.S. Office Action dated Jan. 22, 2014 that issued in U.S. Appl. No. 13/509,112 including Double Patenting Rejections on pp. 4-5.
U.S. Office Action dated Apr. 25, 2014 that issued in U.S. Appl. No. 13/511,721 including Double Patenting Rejections on pp. 2-3.
U.S. Office Action dated Feb. 24, 2015 that issued in U.S. Appl. No. 13/345,199 including Double Patenting Rejections on pp. 4-14.

* cited by examiner (a)

(b)

GLASS WELDING METHOD AND GLASS LAYER FIXING METHOD

TECHNICAL FIELD

The present invention relates to a glass fusing method which manufactures a glass fusing structure by fusing glass members together and a glass layer fixing method therefor.

BACKGROUND ART

Known as a conventional glass fusing method in the above-mentioned technical field is a method which burns a glass layer containing organic matters (organic solvents and binders), a laser-light-absorbing material, and a glass powder onto one glass member along a region to be fused, then superposes the other glass member on the one glass member with the glass layer interposed therebetween, and irradiates the glass layer with laser light along the region to be fused, so as to fuse the glass members to each other.

Meanwhile, for fixing the glass layer to a glass member, techniques for removing the organic matters from the glass layer by irradiation with laser light instead of heating in a furnace have been proposed (see, for example, Patent Literatures 1 and 2). Such techniques can prevent functional layers and the like formed on glass members from being worsened by heating and inhibit the energy consumption from being increased by the use of the furnace and the heating time from becoming longer in the furnace.

CITATION LIST

Patent Literature

Patent Literature 1: Japanese Patent Application Laid-Open No. 2002-366050
Patent Literature 2: Japanese Patent Application Laid-Open No. 2002-367514

SUMMARY OF INVENTION

Technical Problem

However, there has been a case where fixing a glass layer to a glass member by irradiation with laser light (so-called temporary firing) and then fusing glass members to each other with the glass layer interposed therebetween by irradiation with laser light (so-called final firing) makes the fusing state nonuniform and leaves the glass powder of the glass layer as a contaminant, thereby lowering the reliability of the glass fusing structure.

In view of such circumstances, it is an object of the present invention to provide a glass fusing method which can manufacture a highly reliable glass fusing structure and a glass layer fixing method therefor.

Solution to Problem

For achieving the above-mentioned object, the inventor conducted diligent studies and, as a result, has found out that the fusing state becomes nonuniform and the glass powder of the glass layer is left as a contaminant because of the fact that the laser light absorptance of the glass layer drastically increases when the temperature of the glass layer exceeds its melting point $T_m$ as illustrated in FIG. 11.

That is, in the glass layer arranged on the glass member, scattering of light exceeding the absorption characteristic of the laser-light-absorbing material occurs because of the particle property of the glass powder and the like, so as to place it into a lower laser light absorptance state (e.g., it looks whiter under visible light). When the glass layer is irradiated with laser light in such a state with a laser power P so that the glass layer attains a temperature $T_p$ higher than the melting point $T_m$ but lower than its crystallization temperature $T_c$ as illustrated in FIG. 12, the glass powder loses its particle property upon melting and so forth, so that the absorption characteristic of the laser-light-absorbing material appears remarkably, whereby the laser light absorptance of the glass layer rises drastically (e.g., it looks darker or greener under visible light). As a consequence, irradiation with the laser light at the laser power P causes the glass layer to reach a temperature $T_a$ higher than the crystallization temperature $T_c$ in practice.

When the glass layer is irradiated with laser light at such a laser power as to melt but not crystallize the glass layer in a peripheral part of its irradiation region in view of the above in the case where the beam profile of the laser light has a Gaussian distribution, the temperature reaches the crystallization temperature $T_c$ at a center part 30a at which the intensity of the laser light becomes relatively high in a glass layer 30 as illustrated in FIG. 13. As a result, a portion of the center part 30a of the glass layer 30 on the side opposite from a glass member 40 crystallizes. When a part of the glass layer 30 is crystallized by excess heat input, the melting point of the crystallized part becomes higher than that of the non-crystallized part, whereby the fusing state becomes nonuniform in the glass fusing structure manufactured by fusing glass members to each other. FIG. 13 illustrates a case where the glass layer 30 is irradiated with laser light from the side opposite from the glass member 40.

When the glass layer is irradiated with laser light at such a laser power as to melt but not crystallize the glass layer in the center part of its irradiation region in the case where the beam profile of the laser light has a Gaussian distribution, on the other hand, the temperature does not reach the melting point $T_m$ at both edge parts 30b at which the intensity of the laser light becomes relatively low in the glass layer 30 as illustrated in FIG. 14, and the center part 30a of the molten glass layer 30 shrinks when solidifying. As a result, the unmolten glass powder 20 remains near the edge parts 30b of the glass layer 30. Hence, the glass powder 20 of the glass layer 30 remains as a contaminant in the glass fusing structure manufactured by fusing glass members to each other. As with FIG. 13, FIG. 14 illustrates a case where the glass layer 30 is irradiated with laser light from the side opposite from the glass member 40.

Based on the foregoing findings, the inventor has conducted further studies and completed the present invention. That is, the glass fusing method in accordance with the present invention is a glass fusing method for manufacturing a glass fusing structure by fusing first and second glass members to each other, the method comprising the steps of arranging a glass layer containing a laser-light-absorbing material and a glass powder with a predetermined width on the first glass member along an extending region to be fused; irradiating the glass layer with first laser light while relatively moving an irradiation region of the first laser light along the region to be fused, so as to melt the glass layer, thereby fixing the glass layer to the first glass member; and superposing the second glass member on the first glass member having the glass layer fixed thereto with the glass layer interposed therebetween and irradiating the glass layer with second laser light, so as to fuse the first and second glass members to each other; wherein the glass layer is irradiated with the first laser light through the first glass member from the first glass member side. The glass layer fixing method in accordance with the present invention is a method for manufacturing a glass-layer-fixed member by fixing a glass layer to a first glass member, the method comprising the steps of arranging the glass layer containing a laser-light-absorbing material and a glass powder with a predetermined width on the first glass member along an extending region to be fused; and irradiating the glass layer with first laser light while relatively moving an irradiation region of the first laser light along the region to be fused, so as to melt the glass layer, thereby fixing the glass layer to the first glass member; wherein the glass layer is irradiated with the first laser light through the first glass member from the first glass member side.

In the glass fusing method and glass layer fixing method, the glass layer is irradiated with the first laser light through the first glass member from the first glass member side when melting the glass layer and fixing it to the first glass member. This fully heats a part of the glass layer on the first glass member side and thus can improve the adhesion of the glass layer to the first glass member. Further, even when irradiated with the first laser light at such a laser power as to melt both edge parts of the glass layer, the part of the glass layer on the side opposite from the first glass member (i.e., the part of the glass layer fused to the second glass member) is prevented from being crystallized by excess heat input, whereby the fusing state of the glass layer with respect to the second glass member can be made uniform. Hence, the glass fusing method and glass layer fixing method can manufacture a highly reliable glass fusing structure.

Preferably, in the glass fusing method in accordance with the present invention, the glass layer is irradiated with the first laser light while the glass layer is located on the upper side of the first glass member in a vertical direction. In this case, gases (e.g., decomposition gases of a binder and water vapor) generated, if any, when fixing the glass layer to the first glass member by irradiation with the first laser light can efficiently be let out to the upper side.

Preferably, in the glass fusing method in accordance with the present invention, the irradiation region of the first laser light has first regions respectively overlapping both edge parts in a width direction of the glass layer and a second region overlapping a center part between the edge parts and is moved along the region to be fused such that the first regions precede the second region. Though melting the center part of the glass layer earlier than both edge parts may leave the unmolten glass powder near the edge parts of the glass layer because of the shrinkage of the center part at the time of solidifying, melting the edge parts of the glass layer earlier than the center part here can reliably prevent the unmolten glass powder from remaining near the edge parts.

Preferably, the glass fusing method in accordance with the present invention further comprises the step of irradiating a part of the glass layer arranged on the first glass member with third laser light before the step of fixing the glass layer to the first glass member, so as to melt a part of the glass layer, thereby forming a laser-light-absorbing part in the glass layer; and the step of fixing the glass layer to the first glass member irradiates the glass layer with the first laser light while relatively moving the irradiation region of the first laser light along the region to be fused from the laser-light-absorbing part acting as an irradiation start position.

As mentioned above, the laser light absorptance of the glass layer arranged on the first glass member drastically increases when the glass layer melts. Hence, when the irradiation region of laser light is just relatively moved along the region to be fused in order to melt the glass layer arranged on the first glass member, a region in an unstable state where the glass layer is not molten in the whole width thereof appears from the irradiation start position of the laser light to a region in a stable state where the glass layer is molten in the whole width thereof. However, irradiating the glass layer with laser light at such a laser power as to melt the glass layer in the whole width thereof at the irradiation start position of the laser light may crystallize the glass layer by excess heat input.

Therefore, before melting the glass layer so as to fix it to the first glass member, a part of the glass layer is irradiated with the third laser light, so as to melt a part of the glass layer, whereby a laser-light-absorbing part having a laser light absorptance higher than that in a part not irradiated with the third laser light is formed beforehand in the glass layer. Then, using the laser-light-absorbing part as the irradiation start position, the glass layer is irradiated with the first laser light while relatively moving the irradiation region of the first laser light along the region to be fused. Since the irradiation start position of the first laser light thus has already become the laser-light-absorbing part, a region in a stable state in which the glass layer is molten in the whole width thereof can be formed immediately after near the start point for beginning irradiation with the first laser light. Therefore, the glass layer is not required to be irradiated with laser light at such a laser power as to crystallize it. Since the first and second glass members are fused to each other through the glass layer in such a stable state, the fusing state can be made uniform.

Advantageous Effects of Invention

The present invention can manufacture a highly reliable glass fusing structure.

DESCRIPTION OF EMBODIMENTS

Figure 1:
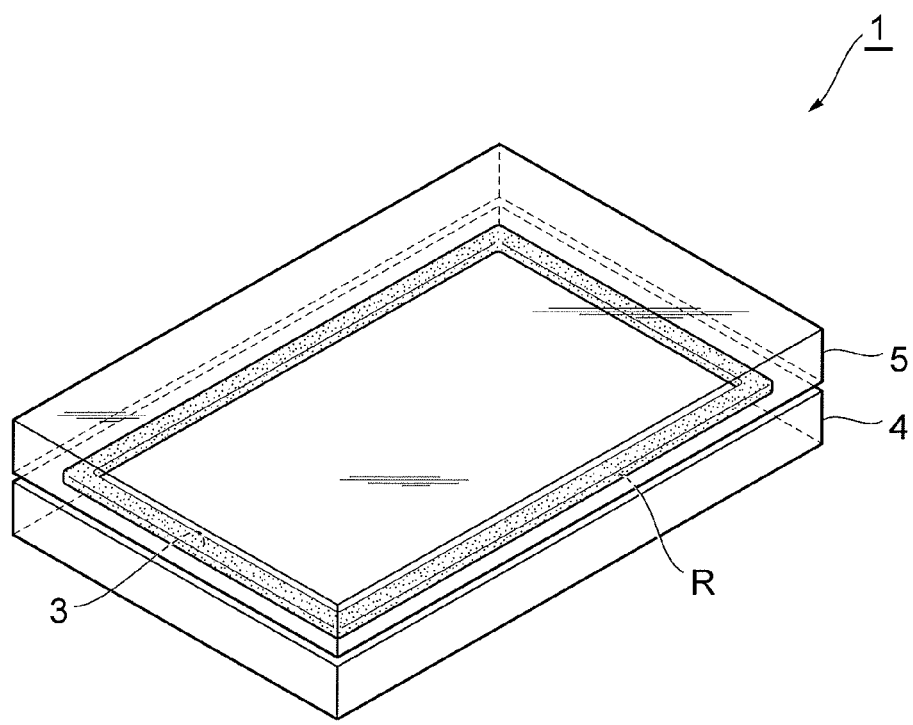
FIG. 1 is a perspective view of a glass fusing structure manufactured by an embodiment of the glass fusing method in accordance with the present invention.

In the following, preferred embodiments of the present invention will be explained in detail with reference to the drawings. In the drawings, the same or equivalent parts will be referred to with the same signs while omitting their overlapping descriptions.

As illustrated in FIG. 1, a glass fusing structure 1 is one in which a glass member (first glass member) 4 and a glass member (second glass member) 5 are fused to each other with a glass layer 3, which is formed along a region to be fused R, interposed therebetween. Each of the glass members 4, 5 is a rectangular sheet-shaped member having a thickness of 0.7 mm made of non-alkali glass, for example, while the region to be fused R is arranged like a rectangular ring with a predetermined width along the outer peripheries of the glass members 4, 5. The glass layer 3 is made of low-melting glass (vanadium-phosphate-based glass, lead-borate-based glass, or the like), for example, and formed into a rectangular ring with a predetermined width along the region to be fused R.

A glass fusing method (including a glass layer fixing method of producing a glass-layer-fixed member by fixing the glass layer 3 to the glass member 4 in order to manufacture the glass fusing structure 1 by fusing the glass members 4, 5 to each other) for manufacturing the glass fusing structure 1 will now be explained.

Figure 2:
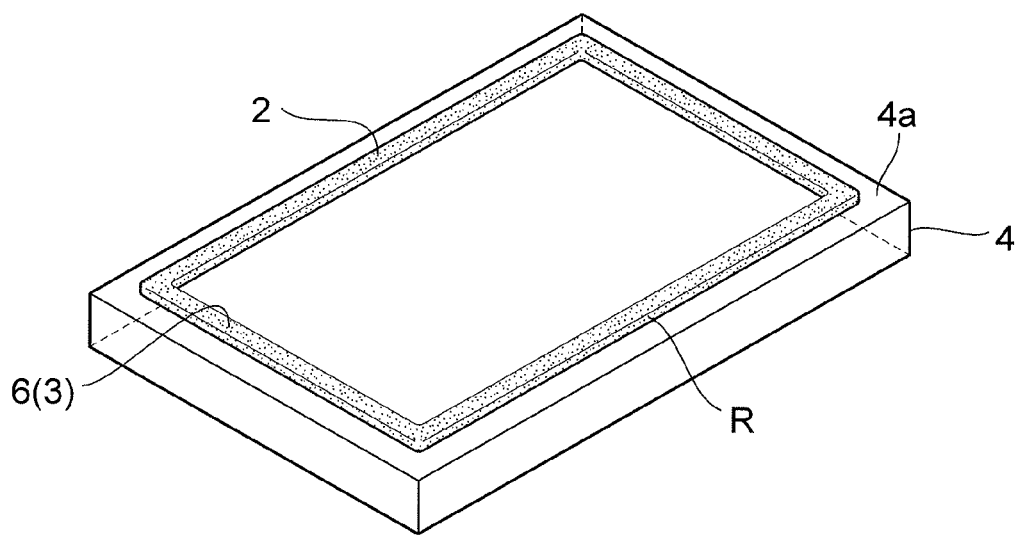
FIG. 2 is a perspective view for explaining the glass fusing method for manufacturing the glass fusing structure of FIG. 1.

First, as illustrated in FIG. 2, a frit paste is applied by a dispenser, screen printing, or the like, so as to form a paste layer 6 on a surface 4a of the glass member 4 along the region to be fused R. An example of the frit paste is one in which a powdery glass frit (glass powder) 2 made of low-melting glass (vanadium-phosphate-based glass, lead-borate-based glass, or the like), a laser-light-absorbing pigment (laser-light-absorbing material) which is an inorganic pigment such as iron oxide, an organic solvent such as amyl acetate, and a binder which is a resin component (acrylic or the like) thermally decomposable at the softening point temperature of the glass or lower are kneaded. That is, the paste layer 6 contains the organic solvent, binder, laser-light-absorbing pigment, and glass frit 2.

Subsequently, the paste layer 6 is dried, so as to remove the organic solvent. This arranges the glass layer 3 with a predetermined width on the glass member 4 along the ring-shaped region to be fused R extending like a rectangular ring. That is, the glass layer 3 contains the binder, laser-light-absorbing pigment, and glass frit 2. Scattering of light exceeding the absorption characteristic of the laser-light-absorbing pigment occurs because of the particle property of the glass frit 2 and the like in the glass layer 3 arranged on the surface 4a of the glass member 4, thereby placing it into a lower laser light absorptance state (e.g., the glass layer 3 looks whiter under visible light).

Figure 3:
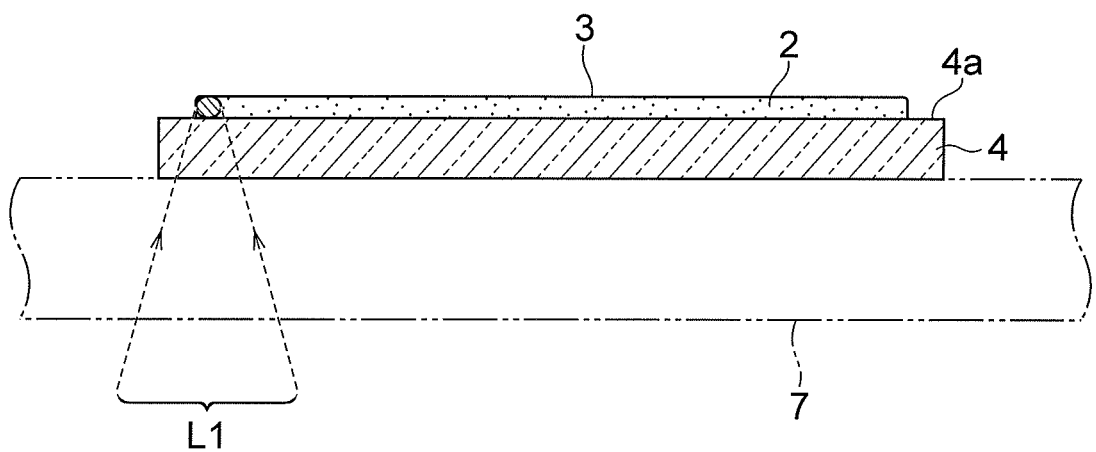
FIG. 3 is a sectional view for explaining the glass fusing method for manufacturing the glass fusing structure of FIG. 1.

Next, as illustrated in FIG. 3, the glass member 4 is mounted on a mount table 7 while the glass layer 3 is located on the upper side of the glass member 4 in the vertical direction. Then, the glass layer 3 formed into a rectangular ring along the region to be fused R is irradiated with laser light (third laser light) L1 while locating a converging spot at one corner thereof. The spot diameter of the laser light L1 is set greater than the width of the glass layer 3, while the laser power of the laser light L1 irradiating the glass layer 3 is adjusted so as to be kept at about the same level in the width direction (substantially orthogonal to the advancing direction of the laser light L1). This melts a part of the glass layer 3 equally in the whole width thereof, thereby forming a laser-light-absorbing part 8a having a higher laser absorptance in the whole width of this part.

Figure 4:
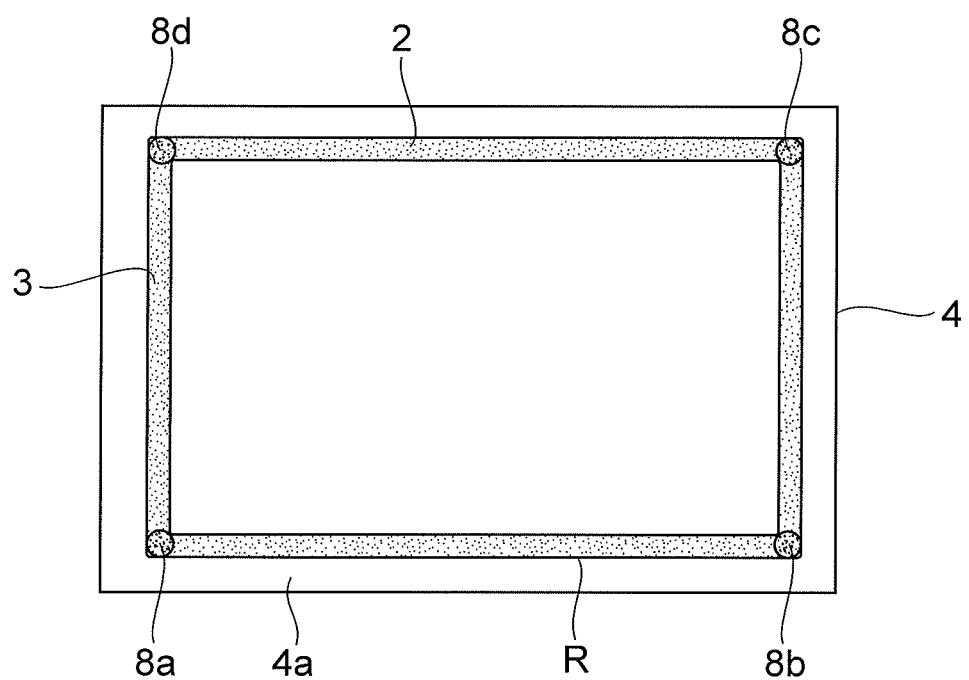
FIG. 4 is a plan view for explaining the glass fusing method for manufacturing the glass fusing structure of FIG. 1.

Thereafter, as illustrated in FIG. 4, the remaining three corners of the glass layer 3 are similarly irradiated with the laser light L1 in sequence, so as to form laser-light-absorbing parts 8b, 8c, 8d. Since the glass frit 2 melts and thus loses its particle property and so forth, the absorption characteristic of the laser-light-absorbing pigment appears remarkably in the laser-light-absorbing parts 8a to 8d, so that the laser light absorptance in these parts is higher than in the region not irradiated with the laser light L1 (e.g., only the corners corresponding to the laser-light-absorbing parts 8a to 8d look darker or greener under visible light).

Figure 5:
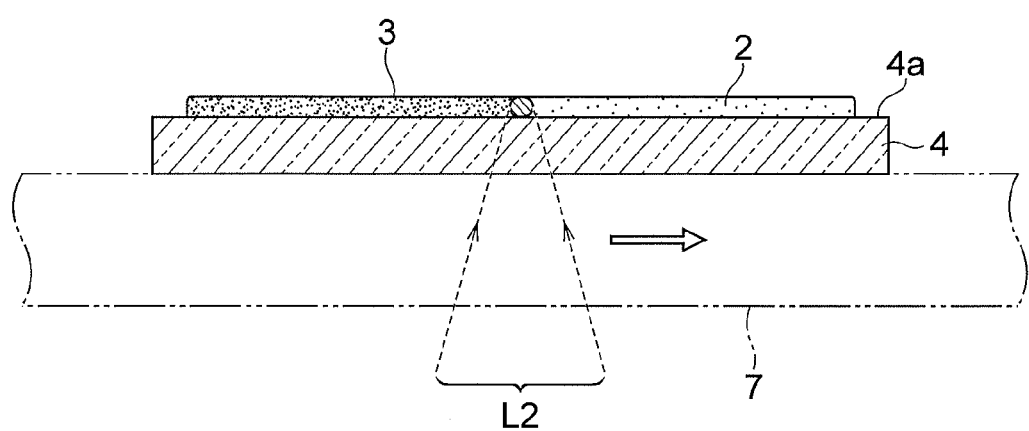
FIG. 5 is a sectional view for explaining the glass fusing method for manufacturing the glass fusing structure of FIG. 1.
Figure 6:
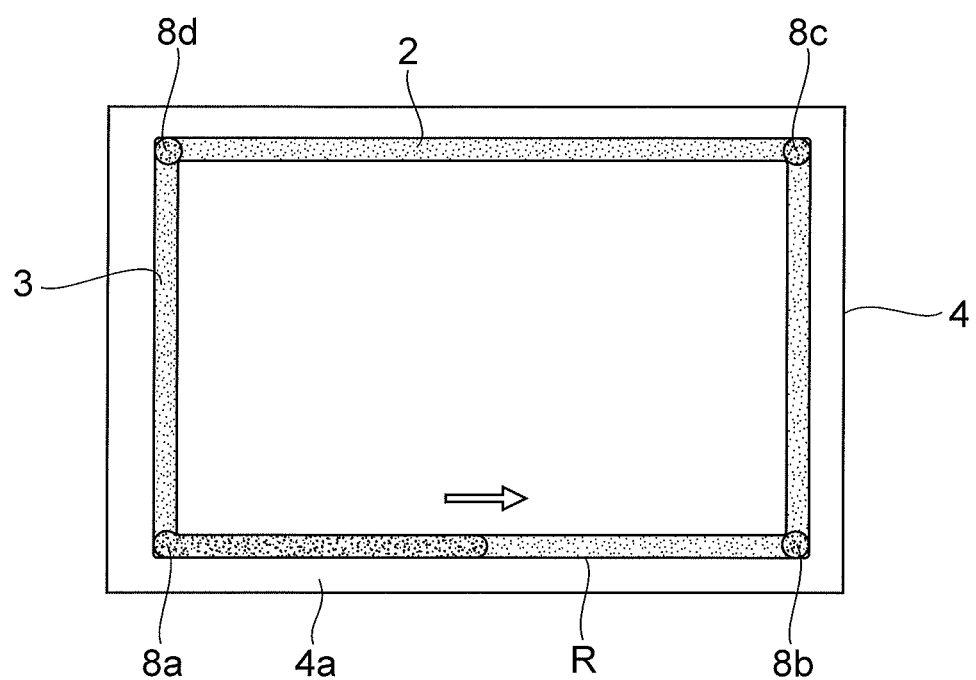
FIG. 6 is a plan view for explaining the glass fusing method for manufacturing the glass fusing structure of FIG. 1.

Subsequently, as illustrated in FIGS. 5 and 6, using the laser-light-absorbing part 8a as a start point (irradiation start position), the glass layer 3 is irradiated with laser light (first laser light) L2 along the region to be fused R while locating a converging spot at the glass layer 3. That is, the glass layer 3 is irradiated with the laser light L2 while relatively moving the irradiation region of the laser light L2 along the region to be fused R from the laser-light-absorbing part 8a acting as the irradiation start position. At this time, while the glass layer 3 is located on the upper side of the glass member 4 in the vertical direction, the glass layer 3 is irradiated with the laser light L2 through an opening (not depicted) provided in the mount table 7 and the glass member 4 from the glass member 4 side (as with the laser light L1). This gasifies the binder, so as to remove it from the glass layer 3, and melts and re-solidifies the glass layer 3, thereby burning and fixing the glass layer 3 onto the surface 4a of the glass member 4 (temporary firing), thus producing a glass-layer-fixed member.

Figure 7:
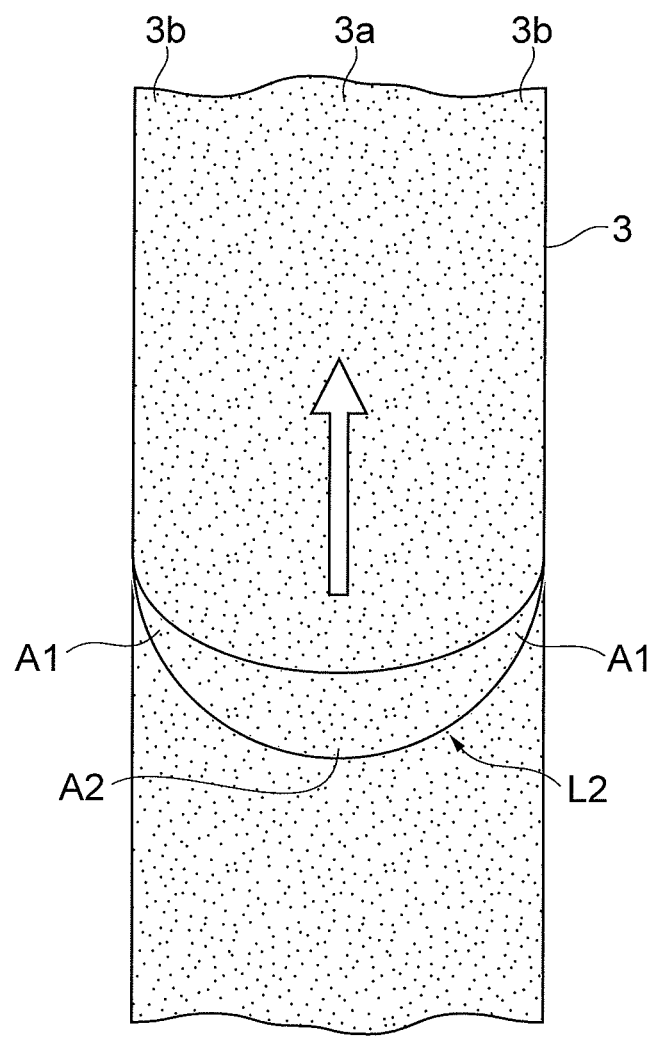
FIG. 7 is a diagram illustrating the relationship between an irradiation region of laser light for temporary firing and a glass layer.

Here, as illustrated in FIG. 7, the irradiation region of the laser light L2 for temporary firing is shaped like a crescent and has first regions A1 (both end parts of the crescent) respectively overlapping both edge parts 3b of the glass layer 3 in the width direction thereof and a second region A2 (the center part of the crescent) overlapping a center part 3a between the edge parts 3b. The irradiation region of the laser light L2 is moved along the region to be fused R such that the first regions A1 precede the second region A2.

At the time of temporary firing for the glass layer 3, the irradiation with the laser light L2 starts from the laser-light-absorbing part 8a having enhanced the laser light absorptance beforehand acting as the irradiation start position, so that the glass layer 3 melts in the whole width thereof immediately after the irradiation start position. This reduces an unstable region with unstable melting of the glass layer 3 and yields a stable region with stable melting of the glass layer 3 in the whole region to be fused R. Since the remaining three corners are also provided with the laser-light-absorbing parts 8b to 8d, respectively, the corners on which loads are likely to be exerted when functioning as the glass fusing structure reliably melt at the time of temporary firing. In the glass layer 3 fixed to the surface 4a of the glass member 4, the glass frit 2 melts, thereby losing its particle property and so forth in the whole region to be fused R, so that the absorption characteristic of the laser-light-absorbing pigment appears remarkably, thus yielding a higher laser light absorptance state.

Figure 8:
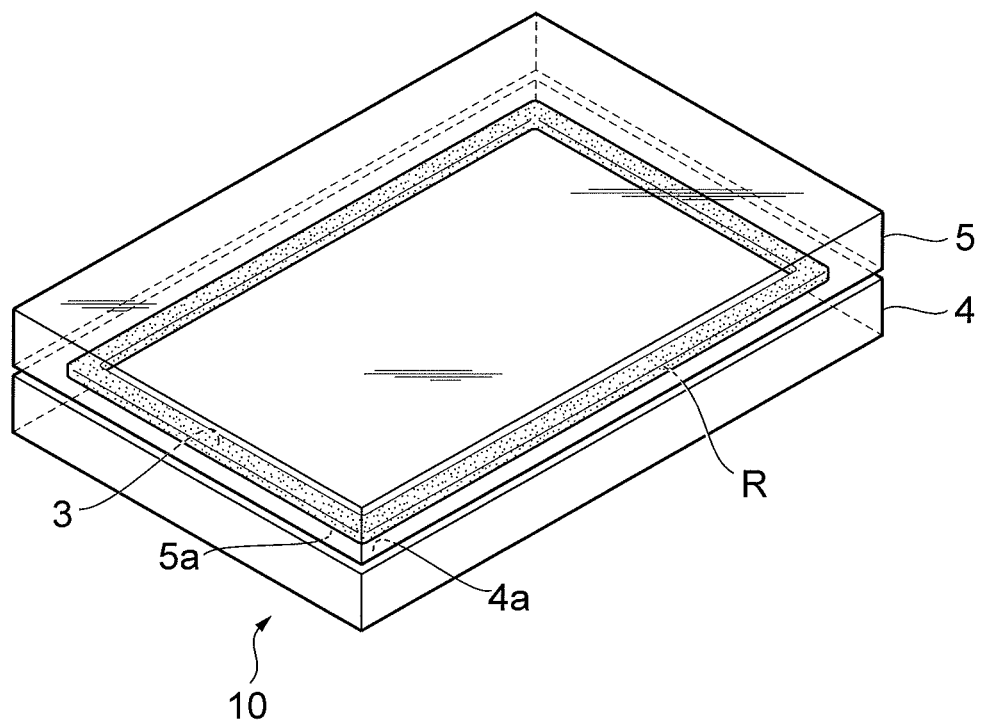
FIG. 8 is a perspective view for explaining the glass fusing method for manufacturing the glass fusing structure of FIG. 1.
Figure 9:
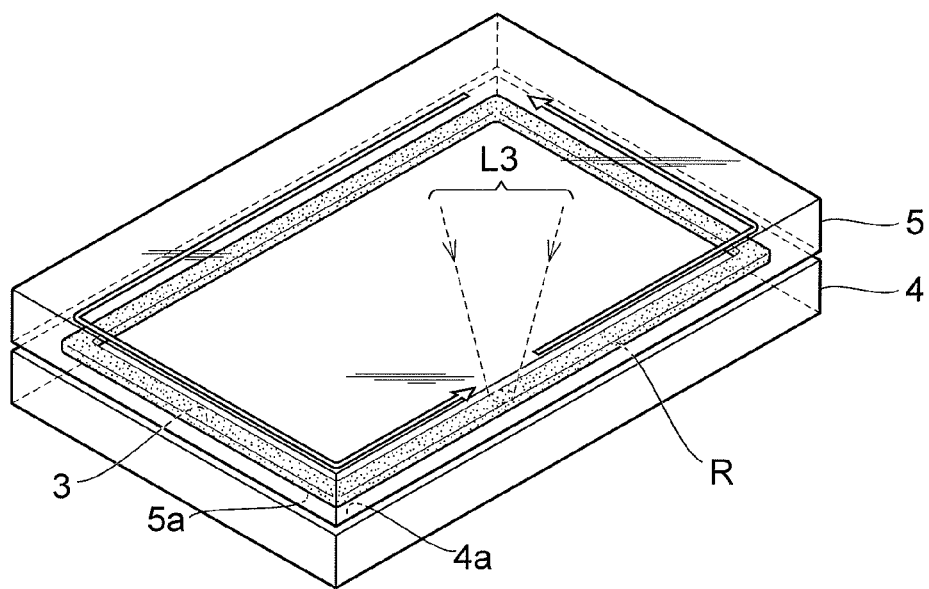
FIG. 9 is a perspective view for explaining the glass fusing method for manufacturing the glass fusing structure of FIG. 1.

Subsequently to the temporary firing for the glass layer 3, the glass member 5 is superposed on a glass-layer-fixed member 10 (i.e., the glass member 4 having the glass layer 3 fixed thereto) with the glass layer 3 interposed therebetween as illustrated in FIG. 8. Then, as illustrated in FIG. 9, the glass layer 3 is irradiated with laser light (second laser light) L3 along the region to be fused R, while locating a converging spot at the glass layer 3. That is, the glass layer 3 is irradiated with the laser light L3, while relatively moving the irradiation region of the laser light L3 along the region to be fused R. As a consequence, the laser light L3 is absorbed by the glass layer 3 having a higher laser light absorptance and uniform state throughout the region to be fused R, so that the glass layer 3 and its peripheral parts (the parts of surfaces 4a, 5a of the glass members 4, 5) melt and re-solidify (final firing), thereby bonding the glass members 4, 5 to each other along the region to be fused R, thus yielding the glass fusing structure 1 (there is also a case where not the glass members 4, 5 but the glass layer 3 melts during fusing). The whole glass layer 3 may be irradiated with the laser light L3 at once.

As explained in the foregoing, the glass fusing method (including the glass layer fixing method) for manufacturing the glass fusing structure 1 irradiates the glass layer 3 with the laser light L2 through the glass member 4 from the glass member 4 side when melting the glass layer 3 and fixing it to the glass member 4 (i.e., at the time of temporary firing). This fully heats a part of the glass layer 3 on the glass member 4 side and thus can improve the adhesion of the glass layer 3 to the glass member 4. Further, even when irradiated with the laser light L2 at such a laser power as to melt both edge parts 3b of the glass layer 3 so that no glass frit 2 remains near the edge parts 3b, the part of the glass layer 3 on the side opposite from the glass member 4 (i.e., the part of the glass layer 3 fused to the glass member 5) is prevented from being crystallized by excess heat input, whereby the fusing state of the glass layer 3 with respect to the glass member 5 can be made uniform. Hence, this glass fusing method can manufacture the glass fusing structure 1 having high reliability.

When fusing the glass members 4, 5 to each other (i.e., at the time of final firing), such a state that the fusing state becomes nonuniform or the glass frit 2 of the glass layer 3 remains as a contaminant does not occur as long as the temporary firing is performed reliably even if both edge parts 3b of the glass layer 3 do not melt completely, for example. The state of temporary firing of the glass layer 3 thus influences the state of final firing of the glass layer 3, so that the irradiation condition of laser light for temporary firing becomes severer than that for final firing.

The glass layer 3 is irradiated with the laser light L2 for temporary firing while the glass layer 3 is located on the upper side of the glass member 4 in the vertical direction. As a consequence, gases (e.g., decomposition gases of the binder and water vapor) generated at the time of temporary firing can efficiently be let out to the upper side.

The irradiation region of the laser light L2 for temporary firing has the first regions A1 respectively overlapping both edge parts 3b in the width direction of the glass layer 3 and the second region A2 overlapping the center part 3a between the edge parts 3b and is moved along the region to be fused R such that the first regions A1 precede the second region A2. Though melting the center part 3a of the glass layer 3 earlier than both edge parts 3b may leave the unmolten glass frit 2 near the edge parts 3b of the glass layer 3 because of the shrinkage of the center part 3a at the time of solidifying, melting the edge parts 3b of the glass layer 3 earlier than the center part 3a here can reliably prevent the unmolten glass frit 2 from remaining near the edge parts 3b.

Before fixing the glass layer 3 to the glass member 4 (i.e., before temporary firing), a part of the glass layer 3 is irradiated with the laser light L1, so as to form the laser-light-absorbing part 8a in the glass layer 3, and the glass layer 3 is irradiated with the laser light L2 at the time of temporary firing while relatively moving the irradiation region of the laser light L2 along the region to be fused R from the laser-light-absorbing part 8a acting as the irradiation start position. Since the irradiation start position of the laser light L2 thus has already become the laser-light-absorbing part 8a, a region in a stable state in which the glass layer 3 is molten in the whole width thereof can be formed immediately after near the start point for beginning irradiation with the laser light L2. Therefore, the glass layer 3 is not required to be irradiated with the laser light L2 at such a laser power as to crystallize it. Since the glass members 4, 5 are fused to each other through the glass layer 3 in such a stable state, the fusing state can be made uniform in the glass fusing structure 1.

Figure 10:
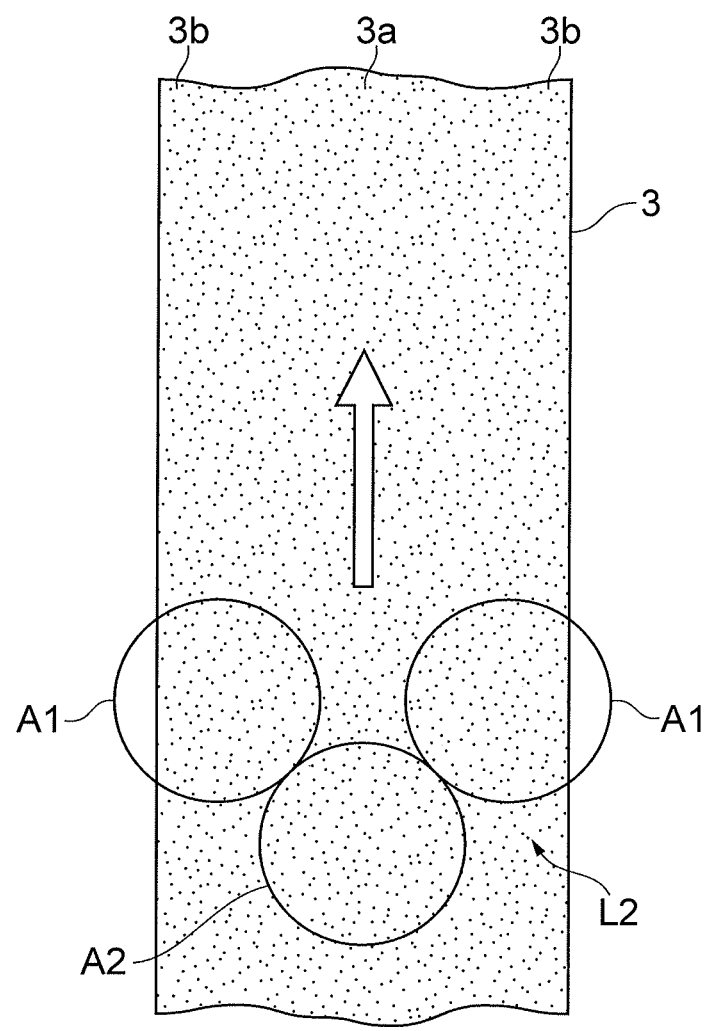
FIG. 10 is a diagram illustrating the relationship between an irradiation region of laser light for temporary firing and the glass layer.
Figure 11:
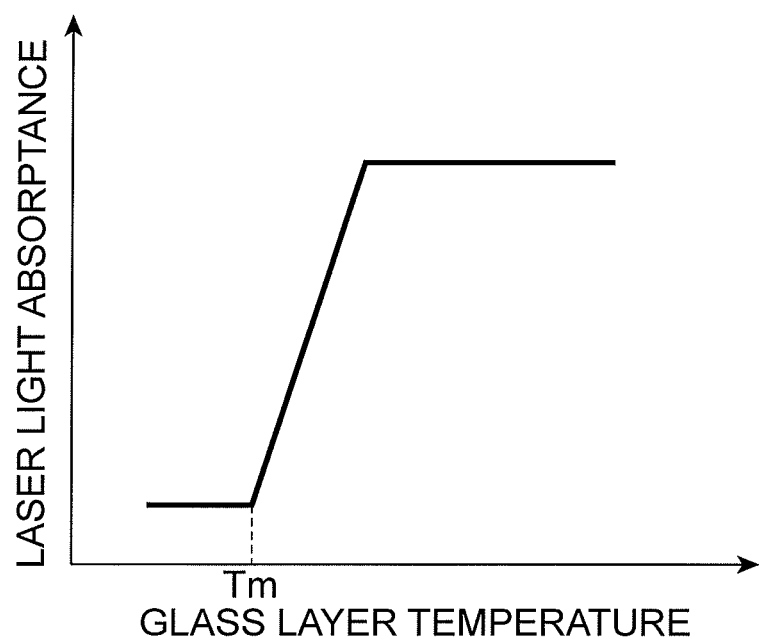
FIG. 11 is a graph illustrating the relationship between temperature and laser light absorptance in the glass layer.
Figure 12:
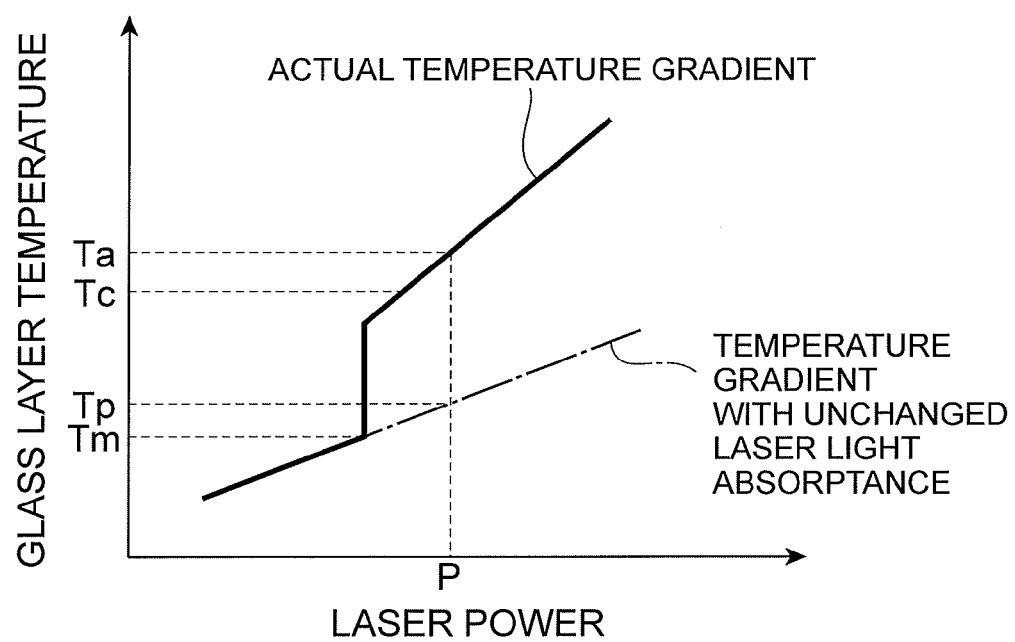
FIG. 12 is a graph illustrating the relationship between laser power and temperature in the glass layer.
Figure 13:
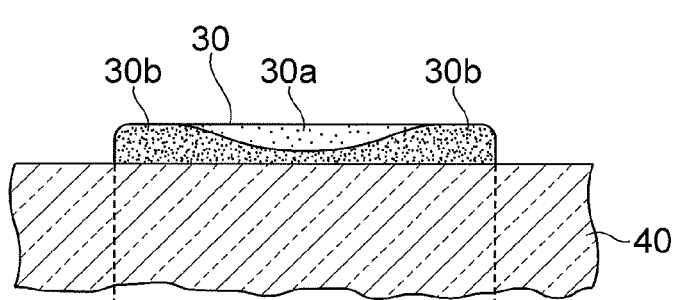
FIG. 13 is a diagram illustrating a temperature distribution of the glass layer in its width direction.
Figure 13:
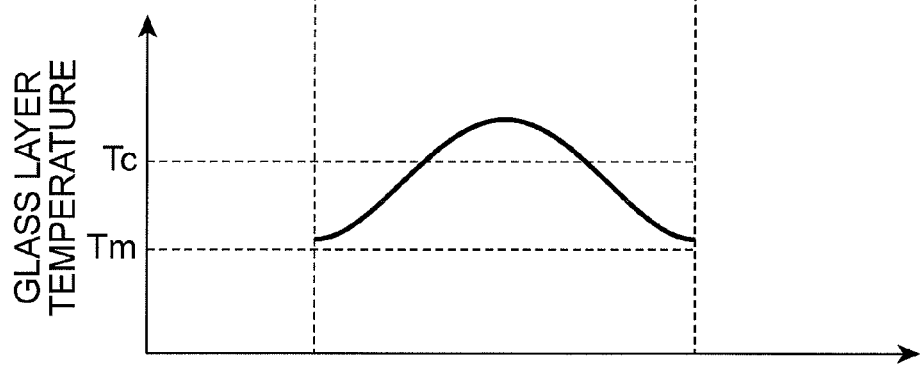
Figure 14:
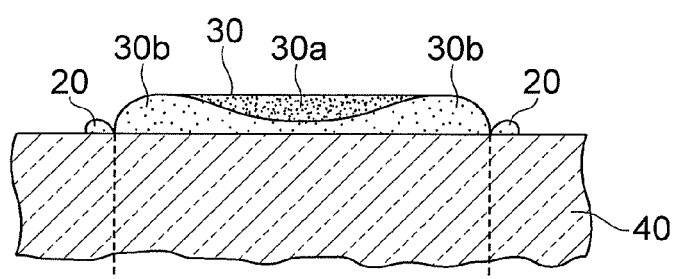
FIG. 14 is a diagram illustrating a temperature distribution of the glass layer in its width direction.
Figure 14:
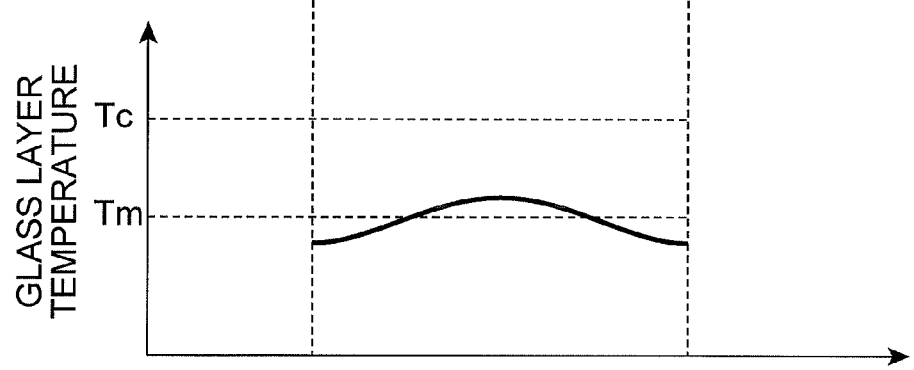

The present invention is not limited to the above-mentioned embodiment. For example, the irradiation region of the laser light L2 for temporary firing is not limited to the crescent form, but may have circular forms in which first regions A1 respectively overlapping both edge parts 3b of the glass layer 3 and a second region A2 overlapping the center part 3a of the glass layer 3 are independent from each other as illustrated in FIG. 10. Such a case can also reliably prevent the unmolten glass fit 2 from remaining near both edge parts 3b if the irradiation region of the laser light L2 is moved along the region to be fused R such that the first regions A1 precede the second region A2.

The glass layer 3 to be irradiated with the laser light L2 for temporary firing is not limited to one containing the binder, laser-light-absorbing pigment, and glass fit 2, but may be one corresponding to the paste layer 6 containing the organic solvent, binder, laser-light-absorbing pigment, and glass fit 2 or one containing the laser-light-absorbing pigment and glass frit 2 without the organic solvent and binder. The glass fit 2 is not limited to one having a melting point lower than that of the glass members 4, 5, but may have a melting point not lower than that of the glass members 4, 5. The laser-light-absorbing pigment may be contained in the glass frit 2 itself.

INDUSTRIAL APPLICABILITY

The present invention can manufacture a highly reliable glass fusing structure.

REFERENCE SIGNS LIST

1 . . . glass fusing structure; 2 . . . glass fit (glass powder); 3 . . . glass layer; 4 . . . glass member (first glass member); 5 . . . glass member (second glass member); 8a to 8d . . . laser-light-absorbing part; 10 . . . glass-layer-fixed member; A1 . . . first region; A2 . . . second region; R . . . region to be fused; L1 . . . laser light (third laser light); L2 . . . laser light (first laser light); L3 . . . laser light (second laser light)

The invention claimed is:

1. A glass fusing method for manufacturing a glass fusing structure by fusing first and second glass members to each other, the method comprising the steps of:
    arranging a glass layer containing a laser-light-absorbing material and a glass powder with a predetermined width on the first glass member along an extending region to be fused;
    irradiating the glass layer with first laser light while relatively moving an irradiation region of the first laser light along the region to be fused, so as to melt the glass layer, thereby fixing the glass layer to the first glass member; and
    superposing the second glass member on the first glass member having the glass layer fixed thereto with the glass layer interposed therebetween and irradiating the glass layer with second laser light, so as to fuse the first and second glass members to each other;

wherein the glass layer is irradiated with the first laser light through the first glass member from the first glass member side.

2. A glass fusing method according to claim 1, wherein the glass layer is irradiated with the first laser light while the glass layer is located on the upper side of the first glass member in a vertical direction.

3. A glass fusing method according to claim 1, wherein the irradiation region of the first laser light has first regions respectively overlapping both edge parts in a width direction of the glass layer and a second region overlapping a center part between the edge parts and is moved along the region to be fused such that the first regions precede the second region.

4. A glass fusing method according to claim 1, further comprising the step of irradiating a part of the glass layer arranged on the first glass member with third laser light before the step of fixing the glass layer to the first glass member, so as to melt a part of the glass layer, thereby forming a laser-light-absorbing part in the glass layer;

wherein the step of fixing the glass layer to the first glass member irradiates the glass layer with the first laser light while relatively moving the irradiation region of the first laser light along the region to be fused from the laser-light-absorbing part acting as an irradiation start position.

5. A glass layer fixing method for manufacturing a glass-layer-fixed member by fixing a glass layer to a first glass member, the method comprising the steps of:

arranging the glass layer containing a laser-light-absorbing material and a glass powder with a predetermined width on the first glass member along an extending region to be fused; and irradiating the glass layer with first laser light while relatively moving an irradiation region of the first laser light along the region to be fused, so as to melt the glass layer, thereby fixing the glass layer to the first glass member;

wherein the glass layer is irradiated with the first laser light through the first glass member from the first glass member side.

\* \* \* \* \*